(12) United States Patent
Gershonsky et al.

(10) Patent No.: US 11,047,659 B2
(45) Date of Patent: Jun. 29, 2021

(54) SMALL CALIBER AMMUNITION CARTRIDGE AND ARMOR PIERCING MATCH BULLET THEREOF

(71) Applicant: IMI Systems Ltd., Ramat HaSharon (IL)

(72) Inventors: Ariel Gershonsky, Ramat HaSharon (IL); Boris Murarash, Ramat HaSharon (IL); Sami Schwartz, Ramat HaSharon (IL)

(73) Assignee: IMI Systems Ltd., Ramat HaSharon (IL)

(*) Notice: Subject to any disclaimer, the term of this patent is extended or adjusted under 35 U.S.C. 154(b) by 0 days.

(21) Appl. No.: 16/388,127

(22) Filed: Apr. 18, 2019

(65) Prior Publication Data

US 2020/0225010 A1    Jul. 16, 2020

(30) Foreign Application Priority Data

Jan. 14, 2019   (IL) .......................................... 264246

(51) Int. Cl.

| F42B 12/74 | (2006.01) |
|---|---|
| C01B 32/949 | (2017.01) |
| F42B 12/06 | (2006.01) |
| F42B 5/02 | (2006.01) |
| F42B 30/02 | (2006.01) |

(52) U.S. Cl.
CPC ............ *F42B 12/74* (2013.01); *C01B 32/949* (2017.08); *F42B 5/025* (2013.01); *F42B 12/06* (2013.01); *F42B 30/02* (2013.01)

(58) Field of Classification Search
CPC .......... F42B 12/74; F42B 5/025; F42B 12/06; F42B 30/02; C01B 32/949
USPC ................................ 102/518, 519, 525, 526
See application file for complete search history.

(56) References Cited

U.S. PATENT DOCUMENTS

| 4,625,650 A | * | 12/1986 | Bilsbury | ............... | F42B 12/204 |
|---|---|---|---|---|---|
| | | | | | 102/364 |
| 5,400,716 A | * | 3/1995 | Mayer | ..................... | F42B 12/78 |
| | | | | | 102/507 |
| 6,070,532 A | | 6/2000 | Halverson | | |
| 6,085,661 A | * | 7/2000 | Halverson | ............... | F42B 12/74 |
| | | | | | 102/516 |
| 6,374,743 B1 | * | 4/2002 | Hug | ........................ | F42B 12/74 |
| | | | | | 102/518 |
| 6,973,879 B1 | | 12/2005 | McElroy et al. | | |

(Continued)

OTHER PUBLICATIONS

Search Report issued in Israel Application No. 264246 dated Dec. 1, 2019.

(Continued)

*Primary Examiner* — John Cooper
(74) *Attorney, Agent, or Firm* — Harness, Dickey & Pierce, P.L.C.

(57) ABSTRACT

A small-caliber projectile having a length Lb, a forward ogive-shaped section, a rear generally cylindrical shaped section, a core, and a jacket generally surrounding the core. The core has a front/penetrator core portion and a soft/heavy rear core portion, wherein the front/penetrator core portion is made of a tungsten alloy and has a length Lp and the soft/heavy rear core portion is made of a lead alloy and has a length Lr and the ratio Lp to Lb is in the range of 0.2 to 0.5.

17 Claims, 7 Drawing Sheets

(56) References Cited

U.S. PATENT DOCUMENTS

| | | | | |
|---|---|---|---|---|
| 7,150,233 | B1* | 12/2006 | Eberhart | F42B 12/74 |
| | | | | 102/516 |
| 7,765,934 | B2 | 8/2010 | Spatz et al. | |
| 7,918,164 | B1 | 4/2011 | Eberhart | |
| 8,869,703 | B1 | 10/2014 | Miller | |
| 2002/0178963 | A1* | 12/2002 | Halverson | F42B 30/02 |
| | | | | 102/516 |
| 2005/0183617 | A1* | 8/2005 | MacDougall | F42B 12/78 |
| | | | | 102/514 |
| 2015/0144019 | A1* | 5/2015 | Andersson | F42B 5/025 |
| | | | | 102/514 |
| 2017/0080498 | A1* | 3/2017 | Burrow | C22C 38/04 |
| 2017/0234663 | A1* | 8/2017 | Schuh | F42B 12/74 |
| | | | | 102/439 |
| 2018/0209768 | A1* | 7/2018 | Peterson | F42B 12/78 |

OTHER PUBLICATIONS

International Search Report of the International Searching Authority issued in PCT/IL2020/050050 dated Mar. 26, 2020.

* cited by examiner

| CARTRIDGE TYPE | COMPLETE PERFORATION PERCENT | | | |
| --- | --- | --- | --- | --- |
| | 7mm thick armored plate i.a.w. MIL-A-12560H | | 3.4mm thick steel plate i.a.w. NATO standard | |
| | 100m | 200m | Two Plates 570m | 800m |
| 7.62mm – M80 | 0% | 0% | 0% | 0% |
| 5.56mm – M855 | 0% | 0% | 0% | N/A |
| 5.56mm – APM, Armor Piercing Match | 100% | 100% | 100% | 100% |

FIG. 10

SMALL CALIBER AMMUNITION CARTRIDGE AND ARMOR PIERCING MATCH BULLET THEREOF

CROSS-REFERENCE TO RELATED APPLICATIONS

This application claims the benefit and priority of IL Patent Application No. 264246, filed Jan. 14, 2019. The entire disclosure of the above application is incorporated herein by reference.

FIELD

The present disclosure relates to small caliber cartridge/rounds, in particular small caliber projectiles such as bullets.

BACKGROUND AND SUMMARY

This section provides background information related to the present disclosure which is not necessarily prior art. This section provides a general summary of the disclosure, and is not a comprehensive disclosure of its full scope or all of its features.

When reviewing the development of NATO small caliber ammunition standardization we need to begin in 1954 when the 7.62 mm NATO ball round was selected as the first NATO standard small caliber ammunition rifle and machine gun cartridge. In the 1960's FN developed its 5.56 mm SS109 round with a 62 grain hardened steel core bullet. In 1980 the SS109 round was chosen as the 2nd NATO standard round based on its compliance with the then existing NATO accuracy and penetration requirements at 600 yards, combined with its being less expensive, lighter in weight and having lower recoil energy. While 7.62 mm NATO ball round has twice as much impact energy, the 5.56 mm SS109 has the following advantages: less expensive; half the cartridge weight of 7.62 mm NATO ball round; lighter carry load for soldier; twice as much ammunition; and functions in lighter weight modern service rifles.

Over the past half century, the modern battlefield has undergone major changes in the field of armor, especially in body armor protection. These changes now require an upgrade in the effectiveness of the current military grade cartridges. During recent decades ammunition manufacturers have made an ongoing effort to improve performance by developing a new caliber between the standard 5.56 mm and 7.62 mm rounds, for example a 6.8 mm caliber round. However, use of new caliber ammunition, and the associated weaponry, entails enormous costs. Various improvements have been proposed for the 5.56 mm round but they often resulted in poor trade-offs between accuracy, penetration, trajectory match and cost in comparison to the standard 5.56 mm NATO ball round.

Another aspect that is important in bullet design is gun-barrel wear/erosion, as previous attempts to improve the effectiveness of 5.56 mm bullets commonly included the use of harder/tougher materials and/or designs that tended to increase gun-barrel erosion, which is costly and disruptive. This erosion can occur during loading from the magazine into the chamber, as well as during travel of the projectile along the length of the barrel.

It is important to note that the issue of cost can be significant when considering the number of rounds used by the masses of regular ground troops (in contrast to special forces or snipers, where cost is less of a consideration) such that even minor design changes that can yet can retain/improve firing effectiveness, and be cost effective, are important. Although there may be trade-offs in the resultant effectiveness and costs, an overall combination of features that balances/optimizes the trade-offs, produces a significant advance in the technology.

It should also be noted that retaining the 5.56 mm caliber, while improving effectiveness, is critical so as to avoid: the issue of manufacturing rifles to suit any new caliber size; inventory issues; training aspects; and administration/logistics issues, as well as the expected increased weight.

It is believed that the following publications represent the current state of the art:

U.S. Pat. No. 6,374,743 (Hug et al., 2002 Apr. 23); U.S. Pat. No. 7,765,934 (Spatz, et al., 2010 Aug. 3); and U.S. Pat. No. 8,869,703 (Miller, 2014 Oct. 28).

U.S. Pat. No. 6,374,743, entitled "Jacketed projectile with a hard core" discloses a jacketed projectile. The projectile includes a tungsten carbide hard core on the front side and a centered, interlocking soft core disposed behind the hard core. A closed air space is located between the front area of the hard core and the tip of the projectile.

U.S. Pat. No. 7,765,934, entitled "Lead-free projectile", discloses a small-bore projectile. The projectile includes a ductile outer jacket, a hard core, and a hollow jacket core. Kinetic energy of the projectile is transmitted to the hard core when a target is hit such that the hard core penetrates the target. The outer jacket is supported by the hollow jacket core, which deforms upon impact without fragmenting.

U.S. Pat. No. 8,869,703, entitled "Techniques utilizing high performance armor penetrating round", discloses an armor penetrating round with an elongated core portion (e.g., a hollow tool steel core) defining a front end, an aft end, and a central cavity which extends from the aft end toward the front end. The central cavity has (i) an aft cross-sectional diameter adjacent the aft end and (ii) a front cross-sectional diameter adjacent the front end, the aft cross-sectional diameter being larger than the front cross-sectional diameter. The armor penetrating round further includes a slug portion (e.g., a pre-compacted pellet of powdered metal), which is disposed within the central cavity adjacent the aft end, and an outer jacket.

The present invention relates to cartridges, in particular projectiles or bullets thereof, and which can be particularly relevant for regular troops, and which can include armor piercing match capabilities.

The terms "projectiles" and "bullets", and derivatives thereof, will be used interchangeably herein the specification and claims.

In accordance with embodiments of one aspect of the present invention there is provided an armor piercing match (APM) bullet that includes a jacket; and a core, the core including a front core portion and a rear core portion, the front (hard/penetrator) core portion made of a tungsten alloy and the (soft and heavy) rear core portion made of a lead alloy. In some embodiments, the armor piercing bullet is a Full Metal Jacket, Boat Tail (FMJ-BT) bullet.

In accordance with embodiments of another aspect of the present invention there is provided a small-caliber projectile having a length $Lb$, the projectile comprising: a jacket; a forward ogive-shaped section; a rear generally cylindrical shaped section; and a core, the core including a front (hard/penetrator) core portion and a rear (soft/heavy) core portion, the front (hard/penetrator) core portion being made of a tungsten alloy and having a length $Lp$ and the rear (soft/heavy) core portion being made of a lead alloy and having a length $Lr$, wherein the ratio $Lp$ to $Lb$ is in the range of 0.2 to 0.5.

In some embodiments, the ratio Lp to Lb is in the range of 0.3 to 0.4. In some embodiments, the front portion and the rear portion comprising a flat and generally transverse interface there-between.

Balance of bullet: A particular range in the ratio of penetrator length (Lp) to overall bullet length (Lb) improves accuracy/reduces spread. In addition, design of the bullet within a particular ratio of penetrator length (Lp) to overall bullet length (Lb) provides a preferred trade-off between accuracy, penetration, barrel erosion and cost.

In some embodiments, the preferred Lp/Lb ratio is in the range of 0.3 to 0.4, considering penetration; bullet cost (based on material costs and manufacturing); accuracy and barrel erosion. Regarding penetration, the hard front (penetrator) core portion, heavy (lead alloy) rear core portion provides for excellent penetration, including in combination with a flat interface between the front and rear core portions. The Lp/Lb ratio in range of 0.3 to 0.4 provides excellent ballistic characteristics, thereby improving accuracy. The soft rear core portion allows inward movement of the jacket during firing thereby contributing to reduced barrel wear.

Reiterating, the flat interface between penetrator/front core portion and "following/pushing" lead-alloy rear core portion improves residual kinetic energy upon impact and thus penetration, and furthermore is easy to manufacture, thereby reducing costs.

The relatively soft material (lead alloy) in the "rear" core portion reduces barrel erosion—in particular when in the portion of the jacket that is adjacent to the grooved/rifled barrel and thus interfaces therewith.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 10 is a table showing an exemplary penetration comparison of the present bullet to prior art bullets.

Corresponding reference numerals indicate corresponding parts throughout the several views of the drawings.

DETAILED DESCRIPTION

Figure 1:
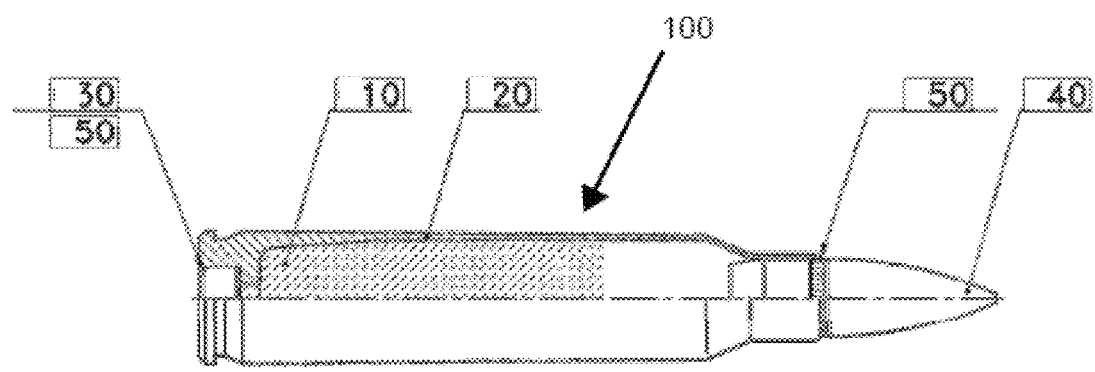
FIG. 1 is a cross-sectional view of an ammunition round of the present invention in accordance with embodiments thereof.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIG. 1 shows an ammunition round 100 of the present invention in accordance with embodiments thereof. Ammunition round 100 includes gun powder 10; a casing 20; a primer 30; a projectile or bullet 40; and sealant 50.

As the invention relates in particular to the projectile or bullet 40 of round 100, further details of the above mentioned components will not be described in further detail.

Figure 2:
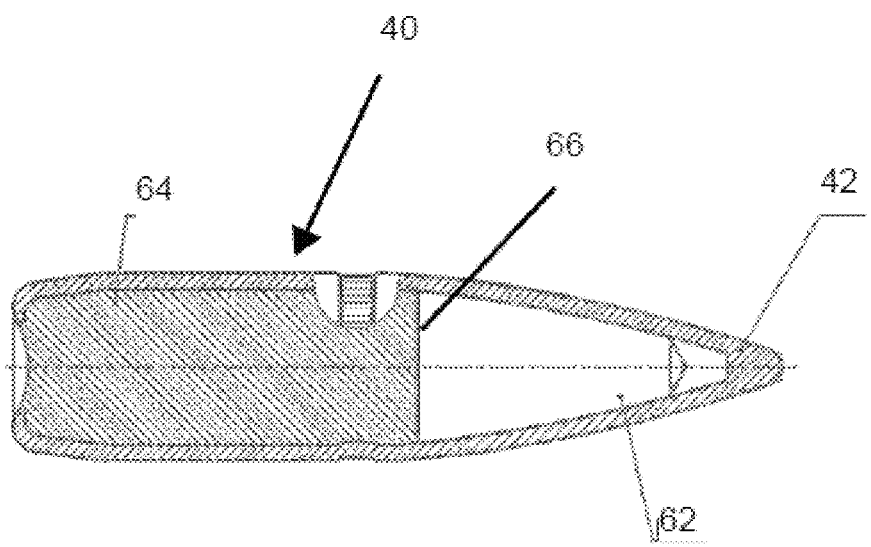
FIG. 2 is a cross-sectional view of a projectile portion (bullet) of the ammunition round of the present invention in accordance with embodiments thereof.
Figure 3:
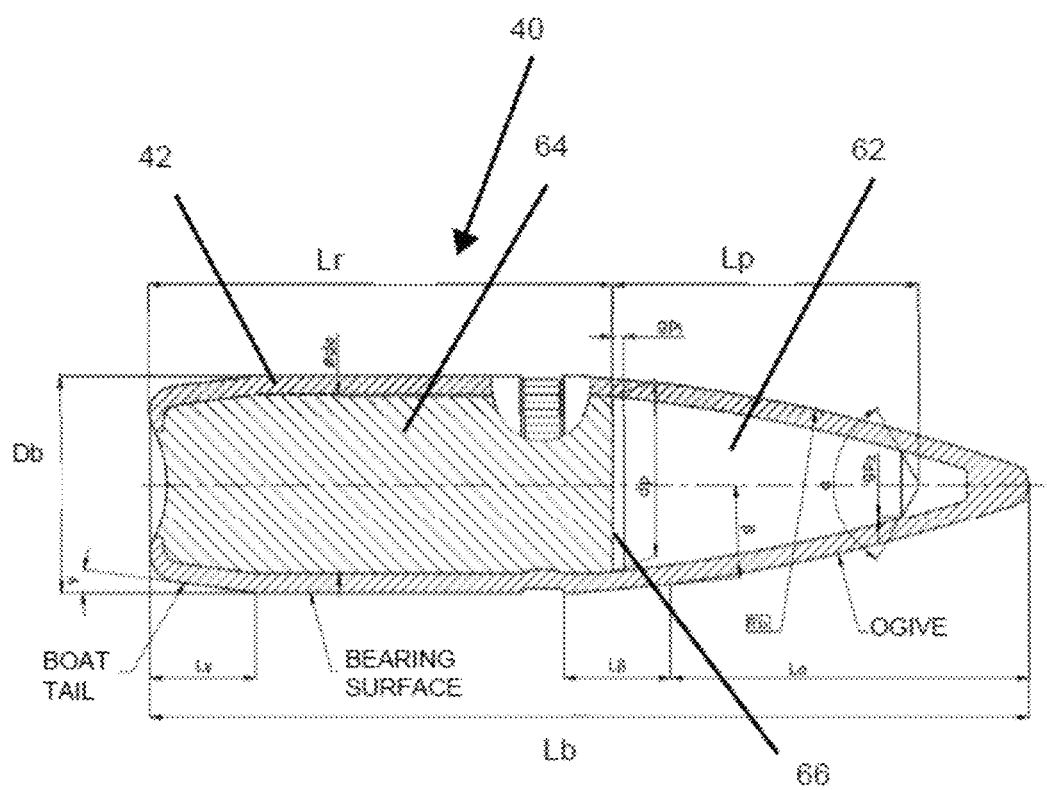
FIG. 3 is a cross-sectional view of FIG. 2 in greater detail.

FIGS. 2 and 3 show embodiments of projectile/bullet 40 of ammunition round 100, FIG. 3 being a more detailed depiction of FIG. 2. Bullet 40 has a length Lb and includes an ogive-shaped front section; and a cylindrical rear section having a tapered/boat-tail rear end portion.

In some embodiments, (with reference to FIG. 3) the overall length of the bullet (Lb) is 22.5 mm to 25 mm; the weight is 4.2 g to 5.2 g; and the ogive portion has the following specifications: 0.5≤(Lo+Lβ)/Lb≤0.55; and the boat tail portion has the following specifications: 0.1≤Lγ/Lb≤0.12.

In some embodiments, the front (hard/penetrator) core portion is made of a tungsten-carbide (WC) alloy having a range of 85% to 95% WC. In some embodiments, the front (hard/penetrator) core portion has the following specifications: density of 14.20 to 14.80 g/cc; Vickers Hardness HV(30)≥1,570; transverse rupture strength (TRS)≥2,500 MPa; grain size<1 μm.

In some embodiments (with reference to FIG. 3) the penetrator portion has the following geometry: its cylindrical ring portion (gp1) has a length≤0.3 mm; an external shape radius; an angle point alpha (α) between 90 and 130 degrees; a flat ring surface (gp2) between 0.03 and 0.1 mm disposed between the angle point and the radius shape. The ratio of the large diameter (dp) of the penetrator core to the bullet diameter (Db) is:

$$0.75 \leq \frac{d_p}{D_b} \leq 0.82$$

In some embodiments the weight of the penetrator portion with respect to the bullet is $$0.20 \leq \frac{Mass_{penetrator}}{Mass_{projectile}} \leq 0.30$$

In some embodiments, the (soft and heavy) rear core portion is made of a MIL-L-13283 Grade 1 lead alloy; and has the following weight ratio range of core to projectile:

$$0.4 \leq \frac{Mass_{rear\ core}}{Mass_{projectile}} \leq 0.6$$

Bullet 40 includes a jacket 42, commonly made of brass or coated steel; and a core 60 with a front core portion 62 (also known as a penetrator) having a length Lp; and a rear core portion 64 having a length Lr. Jacket 42 has a bearing surface that is the widest portion of bullet 40 and which interfaces with the gun barrel (not shown) during firing.

Front core portion 62 is made of a wolfram/tungsten (W) alloy, which is a hard/penetrator portion; and rear core portion 64 is made of a lead (Pb) alloy, which is a soft and heavy/dense portion. There is a front-core/rear-core interface 66 between front core portion 62 and rear core portion 64 that is generally flat and transversely oriented. The flat interface 66 is advantageous in both manufacturing and regarding penetration, as the softer lead-alloy rear core portion 64 (which is dense/heavy due to the lead content, as noted) will tend to press on the hard/penetrator front core portion 62 upon impact of bullet 40 with its target (e.g. armor), thus preserving the overall and impact kinetic energy to the extent possible.

It is a particular feature of bullet 40 that there is a ratio Lp/Lb between the length Lp of the penetrator (front core portion 62) and the length Lb of the bullet that provides a preferable design (preferred trade-off in terms of the resultant combination of design factors, in particular: cost, accuracy, gun barrel wear, and penetration—while preferably also providing a close trajectory match to the standard 5.56 mm bullet (or other caliber, mutatis mutandis).

Figure 4:
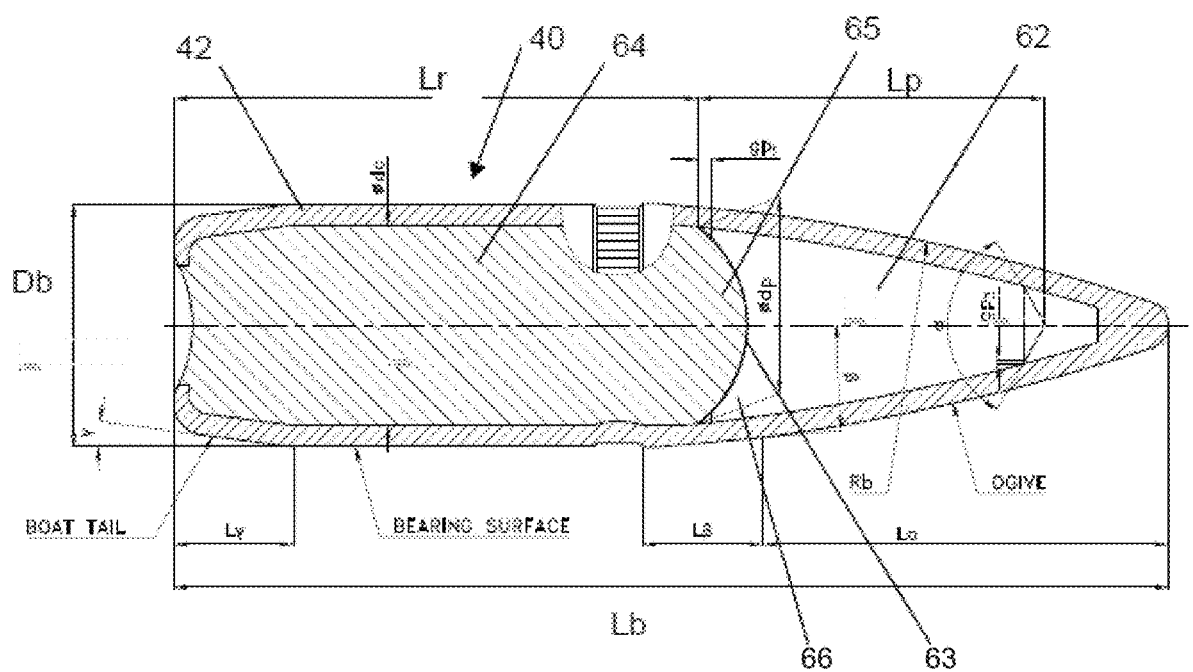
FIG. 4 is a cross-sectional view of similar to FIG. 2 illustrating an exemplary embodiment.

FIG. 4 shows an alternate embodiment wherein the interface 66 is provided by front core portion 62 having a concave rear end 63, and rear core portion 64 having a corresponding convex front end 65. This design can save on material costs of the more expensive front/penetrator core portion 62; and, without limitation to theory, this design can also help the kinetic energy transfer from the dense rear core portion 64 to the front/penetrator core portion 62.

Figure 5:
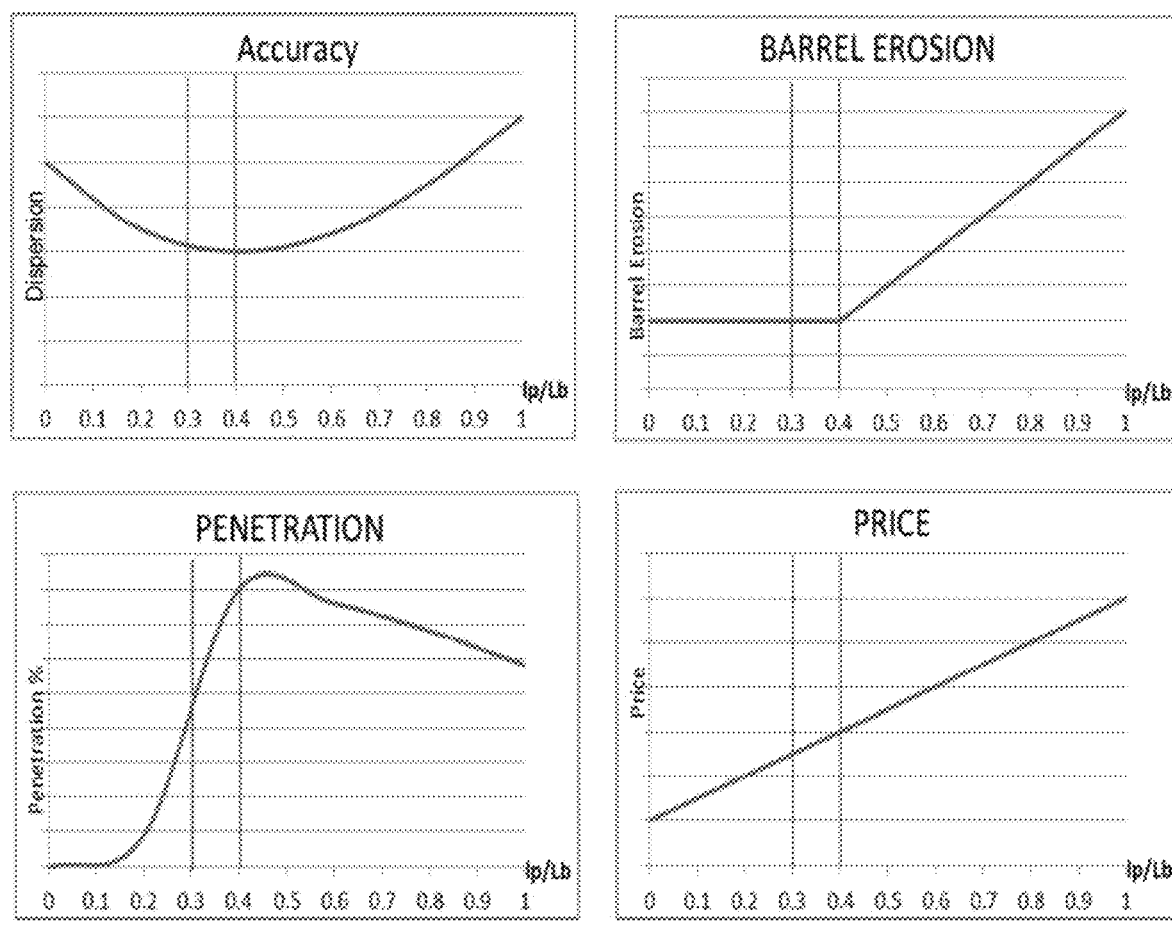
FIG. 5 is a series of graphs indicating test results regarding design factors of the present bullet.

FIG. 5 shows a series of graphs indicating test results regarding design factors of the present bullet including accuracy (dispersion/spread); barrel erosion; penetration; and cost (price) of producing the bullet. It should be noted and obvious that each one of these parameters is extremely important and also not easily balanced, i.e. there can be difficult trade-offs.

Figure 6:
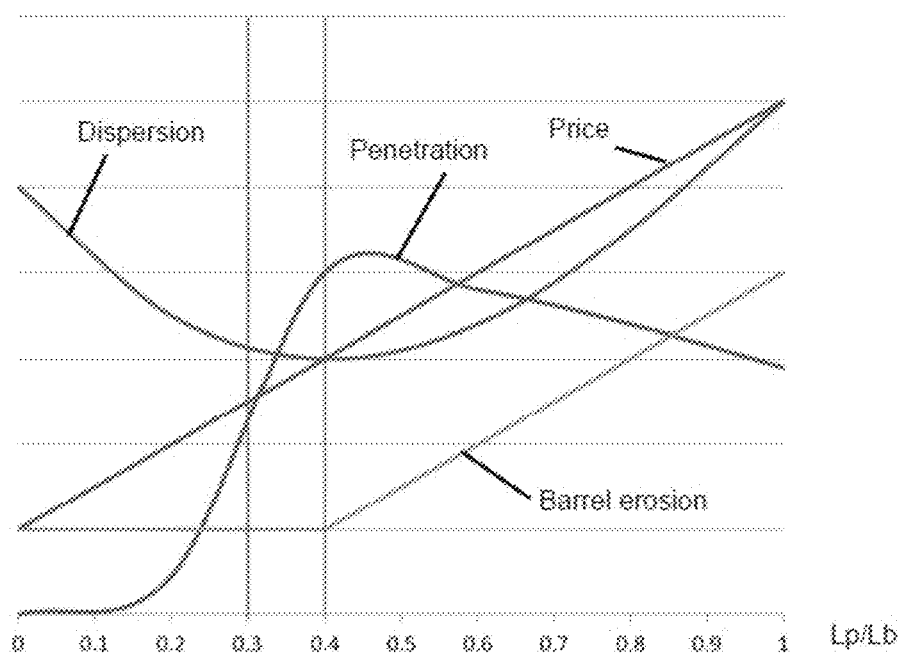
FIG. 6 is a graph integrating the test results of the graphs in FIG. 4.

As can be seen, also with reference to FIG. 6, that the accuracy improves with a balance of front to rear core lengths whereby the penetrator length Lp (length of front core 62) to the overall bullet length, Lb, i.e. Lp to Lb ratio, is in the general range of 0.3 to 0.5.

Regarding barrel erosion, it can be seen that a low penetrator length Lp (length of front core 62) to overall bullet length, Lb, is preferable, in the Lp to Lb ratio range of 0 to 0.4.

Regarding penetration, it can be seen that a fairly balanced ratio of penetrator length Lp (length of front core 62) to overall bullet length, Lb, is preferable, in the Lp to Lb ratio range of 0.4 to 0.5. However, as will be discussed below, bullet penetration with a design having a Lp/Lb ratio range of 0.3 to 0.4 provides sufficient penetration.

Regarding price/cost, it is not surprising to see that a low penetrator length Lp (length of front core 62) to overall bullet length, Lb, is preferable, as the material of front/penetrator core portion 62 is expensive. However, it is believed that the cost is reasonable in the Lp/Lb ratio range of 0.3 to 0.4, in particular in light of the fact that if the accuracy and penetration parameters are not adequate, no amount of cost savings is sufficient.

As described below, a bullet was tested, which had the following specifications: Lp/Lb=0.35; bullet diameter of 5.56 caliber; jacket material: brass 90/10; the rear core portion was a MIL-L-13283 Grade 1 lead alloy; and a penetrator core tungsten-carbide alloy with a density of 14.45 g/cc.

Figure 7:
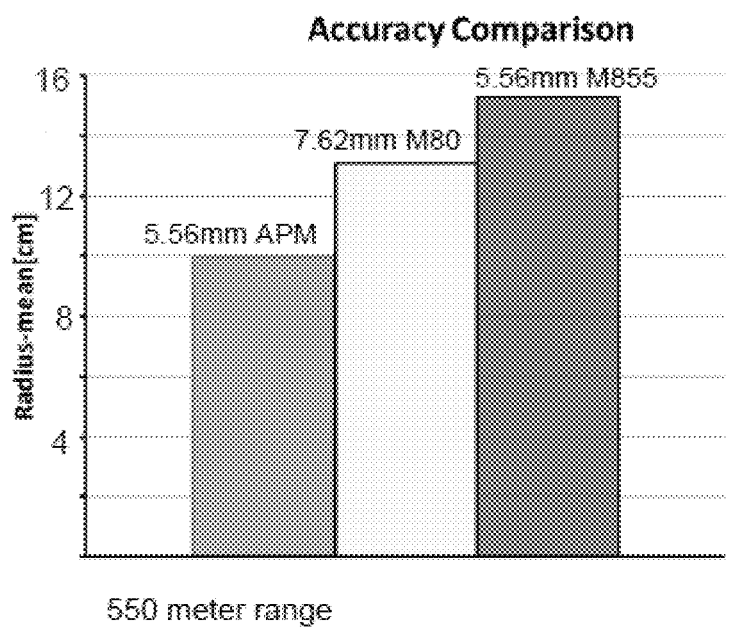
FIG. 7 is a bar graph comparing the accuracy, by way of spread radius, of the present bullet to two prior art bullets.

FIG. 7 is a bar graph comparing the accuracy, by way of spread radius, of the present bullet (termed 5.56 mm APM—Armor Piercing Match) to two prior art bullets, namely the 7.62 mm caliber M80 and the 5.56 mm caliber M855. As can be seen, the present bullet (5.56 mm APM) has superior accuracy at the 550 meter range with a mean spread/dispersion radius of about 10 cm, compared to about 13 cm for the 7.62 mm M80 and about 15.5 cm for the 5.56 mm caliber M855.

Figure 8:
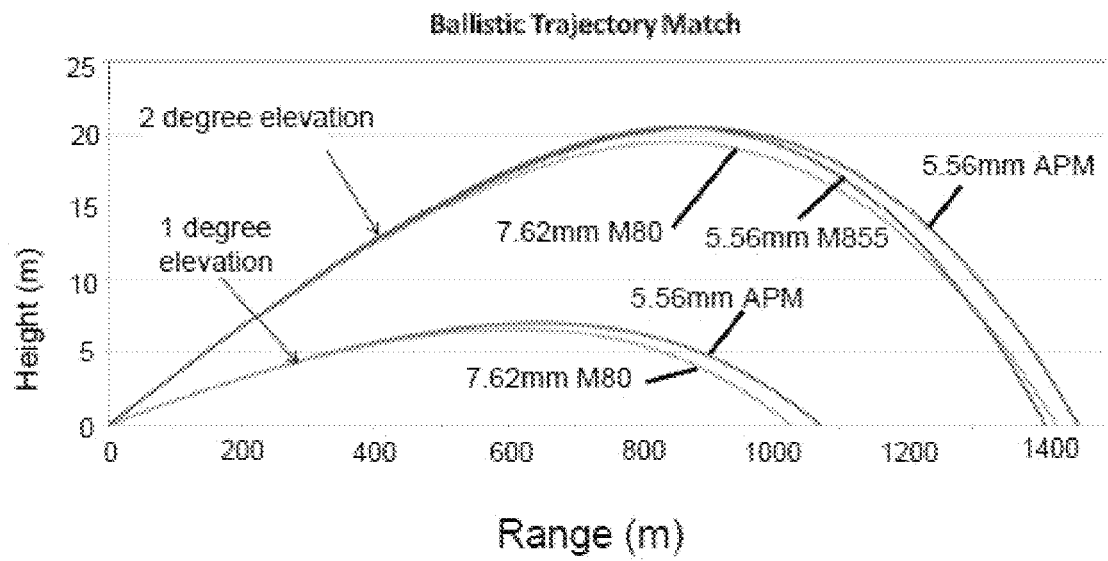
FIG. 8 is a graph showing trajectory matching of the present bullet to prior art bullets at two firing angles.
Figure 9:
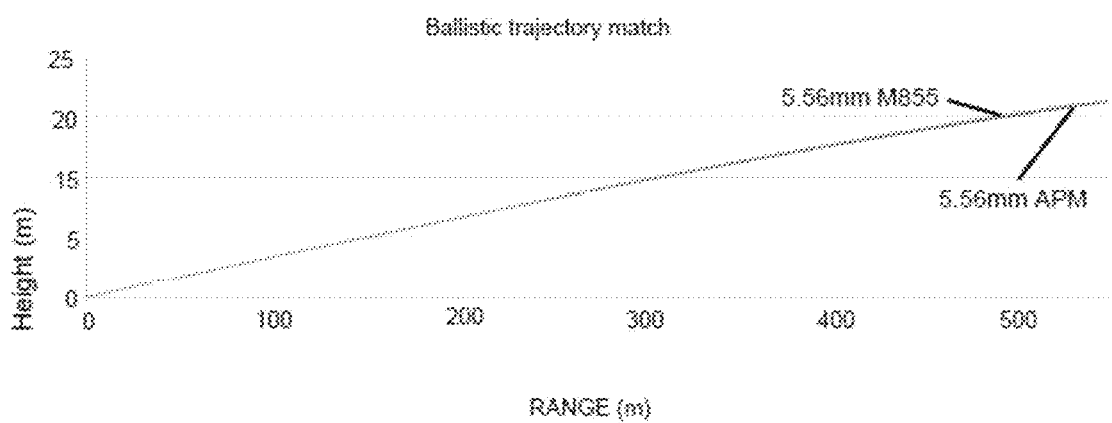
FIG. 9 is a graph showing trajectory matching of the present bullet to a same caliber bullet at a shorter range than FIG. 7.

FIGS. 8 and 9 illustrate the excellent trajectory matching of the present bullet to prior art bullets. FIG. 8 shows that the present (5.56 APM) bullet has excellent trajectory matching, especially at low to medium range, at a 2-degree firing angle, compared to the 7.62 mm caliber M80 and 5.56 mm caliber M855 bullets. In a comparison at a 1-degree firing angle, the present (5.56 mm APM) bullet also showed excellent trajectory matching, especially at low to medium range, compared to the 5.56 mm caliber M855 bullet.

FIG. 9 shows the excellent trajectory matching of the present bullet to the same caliber bullet (5.56 mm M855) at an effective firing range.

FIG. 10 compares the penetration between the present bullet to that of the 7.62 mm caliber M80 and 5.56 mm caliber M855 bullets. As noted, the present (5.56 mm APM) bullet achieves a 100% penetration through a 7 mm thick armored plate (i.a.w., MIL-A-12560H) at a range of 100 meters and a range of 200 meters, whereas the neither of the 7.62 mm caliber M80 and 5.56 mm caliber M855 bullets penetrate at either test range.

The table of FIG. 10 shows other penetration tests results wherein the present (5.56 mm APM) bullet achieves a 100% penetration through a 3.4 mm thick standard NATO steel plate constituted in one test by two plates and tested at a 570 meter range; and one plate at an 800 meter range. In contrast, neither the 7.62 mm caliber M80 bullet nor the 5.56 mm caliber M855 bullet penetrates at the 570 meter range; and the 7.62 mm caliber M80 bullet did not penetrate at the 800 meter range. Other test results presents 5.56 mm APM bullet achieves a 100% penetration through a 7 mm thick armored plate MIL-A-12560H at ranges of 100 and 200 meters. In contrast, neither the 7.62 mm caliber M80 bullet nor the 5.56 mm caliber M855 bullet penetrates the 7 mm armored plate.

With reference to the results shown in the table below, calculation of a fire-power coefficient will now be addressed.

Table comparing operation of the present APM bullet to NATO-standard bullets (with reference to FIG. 7 to FIG. 10):

| Bullet type | Accuracy improvement | Penetration improvement | Weight reduction |
| --- | --- | --- | --- |
| 5.56 mm Ball | 35% | 100% | −5% |
| 7.62 mm Ball | 30% | 100% | 100% |

The principle parameters determining fire power of infantry troops are: accuracy; penetration; and weight of the weaponry. Using a weighting of 0.4 for accuracy; 0.4 for penetration; and 0.2 for weaponry weight, fire power can be calculated as:

Fire Power=Accuracy+Penetration+Weight=0.4$A$+ 0.4$P$+0.2$W$

F.P.(APM vs. $M$855)=0.4*1.35+0.4*2+0.2*0.95=1.53

F.P.(APM vs. $M$80)=0.4*1.30+0.4*2+0.2*2=1.72

The results of the calculations indicate that the effectiveness of the present bullet tested is about 50% better than the M855/SS109; and at least 70% better than the M80. And, with consideration of the resultant weight savings of the weapon and bullet, the improvement in effectiveness of the present bullet can reach about 90% compared to the M80.

Considering the above parameters and calculations, the present bullet is an excellent choice to replace the above-mention BALL projectiles for infantry troops. Such a replacement will result in improved fire-power, penetration, weight reduction, and lower cost, while retaining the present 5.56 mm caliber parameter, thus avoiding rifle replacement and potentially reducing/eliminating the need for other caliber bullets and associated weaponry.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A small-caliber projectile having a length Lb, the projectile comprising:
   a forward ogive-shaped section;
   a rear generally cylindrical shaped section;
   a core; and
   a jacket generally surrounding the core;
   wherein the core includes a front/penetrator core portion and a soft and heavy rear core portion, the front/penetrator core portion being made of a tungsten alloy and having a length Lp and the sof and heavy rear core portion being made of a lead alloy and having a length Lr and wherein the ratio Lp to Lb is in the range of 0.2 to 0.5.

2. The projectile of claim 1, wherein the ratio Lp to Lb is in the range of 0.3 to 0.4.

3. The projectile of claim 1, wherein the front/penetrator core portion and the soft and heavy rear core portion have a flat interface there-between.

4. The projectile of claim 3, wherein the interface is transverse to the projectile.

5. The projectile of claim 1, wherein the front/penetrator core portion has a concave rear end; and the soft and heavy rear core portion has a corresponding convex front end.

6. The projectile of claim 1, wherein the front/penetrator core portion comprises a front shape angle between 90 and 130 degrees.

7. The projectile of claim 1, wherein the front/penetrator core portion has a diameter dp at its largest width and the projectile has a diameter Db at its largest width, and the ratio of dp to Db is between 0.75 and 0.82.

8. The projectile of claim 1, wherein the mass of the front/penetrator core portion with respect to the mass of the projectile is between 0.2 and 0.3.

9. The projectile of claim 1, wherein the mass of the soft and heavy rear core portion with respect to the mass of the projectile is between 0.4 and 0.6.

10. The projectile of claim 1, wherein the projectile has a length in the range of 22.5 mm to 25 mm.

11. The projectile of claim 1, wherein the projectile has a weight range of 4.2 g to 5.2 g.

12. The projectile of claim 1, wherein the front/penetrator core portion is made of a tungsten-carbide (WC) alloy having a range of 85% to 95% WC.

13. The projectile of claim 1, wherein the front/penetrator core portion has a density in the range of 14.20 to 14.80 g/cc.

14. The projectile of claim 1, wherein the front/penetrator core portion has a Vickers Hardness HV(30) greater than 1,570.

15. The projectile of claim 1, wherein the front/penetrator core portion has a transverse rupture strength (TRS) greater than 2,500 MPa.

16. The projectile of claim 1, wherein the front/penetrator core portion has a grain size less than 1 μm.

17. The projectile of claim 1, wherein the rear generally cylindrical shaped section has a tapered/boat tail rear end portion.

\* \* \* \* \*